(12) United States Patent
Cranston or Gramton

(10) Patent No.: X8025
(45) Date of Patent: Feb. 18, 1834

(54) PRESS, LEVER, PROGRESSIVE

(76) Inventor: Jesse Cranston or Gramton

Jesse Cramton.

Letters Patent.

The schedule referred to in these Letters Patent and making part of the
same containing a description in the words of the said Jesse Crampton him-
self of his improvement in the Press.

I construct a frame of iron or wood somewhat similar to other frames for
presses, having uprights with a bed piece and two or four cap pieces strongly
framed together, between the cap pieces is the shaft to which the cams are attached,
the shaft crosses the frame with the cap pieces & the shaft is to contain either
two or four cams, when the shaft contains but two cams, they are placed
near the centre of the shaft on each side a double rack which is at-
tached to the follower, in the centre when the shaft contains four cams
they are placed near each end of the shaft to [illegible] [illegible] double racks, these
on each end of the follower, the cams are [illegible] on the shaft on opposite
sides so that when one cam is up the other is down, or when two are up, two
are down, to accomplish continued pressure there are sliding blocks with fric-
tion rollers; connected with these blocks are double hinge springs, with springs
or weights to throw them into the racks which continue the pressure downwards
These blocks are to be raised alternately by straps of iron or some other
[illegible] passing over the cams on the shaft
The press contains either two or four double racks which are placed either
in the centre of the press or on each end of the follower, the follower contains
either two or four friction rollers [illegible] the racks if expedient.
The press operates either with a wheel or lever attached to the iron shaft
either at one or both ends, the follower and racks are drawn up by a [illegible]
chain or strap, attached to the shaft, the spurs are to be released either
by a hinge or a slide catch placed on the inner sides of the cap.
The parts I claim as my invention are those which cause the continu-
-ed pressure, which is the application of the racks and sliding blocks to the

United States Patent

Patent No.: X8025 cam press. This machine I intend to apply to the following articles, to wit, books, paper, cotton, hay, apples, cheese, tobacco, rags, flour, meal &c also for pulling, paper making, stamping, castor oil, &c Witnesses Leoi H. Crampton Henry C. Crampton Jesse Crampton Exd.

Wd.